US012790699B2

(12) United States Patent
Rappleye et al.

(10) Patent No.: US 12,790,699 B2
(45) Date of Patent: Nov. 10, 2026

(54) PRODUCTION OF CARBON PRODUCTS IN MOLTEN SALT MEDIA

(71) Applicants: Lawrence Livermore National Security, LLC, Livermore, CA (US); University of Utah Research Foundation, Salt Lake City, UT (US)

(72) Inventors: Devin Rappleye, Tracy, CA (US); Chao Zhang, Tracy, CA (US)

(73) Assignees: Lawrence Livermore National Security, LLC, Livermore, CA (US); University of Utah Research Foundation, Salt Lake City, UT (US)

( * ) Notice: Subject to any disclaimer, the term of this patent is extended or adjusted under 35 U.S.C. 154(b) by 822 days.

(21) Appl. No.: 16/745,181

(22) Filed: Jan. 16, 2020

(65) Prior Publication Data

US 2020/0232106 A1 Jul. 23, 2020

Related U.S. Application Data

(60) Provisional application No. 62/794,254, filed on Jan. 18, 2019.

(51) Int. Cl.
*C25B 9/17* (2021.01)
*C25B 9/09* (2021.01)
(Continued)

(52) U.S. Cl.
CPC .................. *C25B 9/17* (2021.01); *C25B 9/09* (2021.01); *C25B 9/19* (2021.01); *C25B 11/04* (2013.01);
(Continued)

(58) Field of Classification Search
CPC .... C25B 9/09; C25B 9/17; C25B 9/19; C25B 11/04; C25B 11/042
See application file for complete search history.

(56) References Cited

U.S. PATENT DOCUMENTS

2016/0115601 A1* 4/2016 Dryfe ........................ C25B 1/00 205/615

FOREIGN PATENT DOCUMENTS

CN 105624722 A * 6/2016 ............... C25B 1/00
JP 2010053425 A * 3/2010
(Continued)

OTHER PUBLICATIONS

Koya Otake, Hiroshi Kinoshita, Tatsuya Kikuchi, Ryosuke O. Suzuki, CO2 gas decomposition to carbon by electro-reduction in molten salts, Electrochimica Acta, vol. 100, 2013, pp. 293-299 (Year: 2013).*

(Continued)

*Primary Examiner* — Luan V Van
*Assistant Examiner* — Mofoluwaso S Jebutu
(74) *Attorney, Agent, or Firm* — Zilka-Kotab, P.C.

(57) ABSTRACT

According to one embodiment, a system includes an electrochemical cell that includes a crucible having a molten $CaCO_3$:$CaCl_2$:CaO mixture therein, where a cathode and an inert anode are positioned in the molten $CaCO_3$:$CaCl_2$:CaO mixture, and an inlet for feeding carbon dioxide gas into the molten $CaCO_3$:$CaCl_2$:CaO mixture. In addition, the system includes a furnace having an inert atmosphere therein, where the electrochemical cell is sealed in the furnace having the inert atmosphere.

20 Claims, 2 Drawing Sheets

(51) Int. Cl.

| | |
|---|---|
| ***C25B 9/19*** | (2021.01) |
| ***C25B 11/04*** | (2021.01) |
| ***C25B 11/042*** | (2021.01) |
| ***C25B 15/02*** | (2021.01) |
| ***C25B 15/08*** | (2006.01) |
| ***F27B 14/04*** | (2006.01) |
| ***F27D 11/10*** | (2006.01) |
| ***F27D 99/00*** | (2010.01) |

(52) U.S. Cl.

CPC ............ *C25B 11/042* (2021.01); *C25B 15/02* (2013.01); *C25B 15/08* (2013.01); *F27B 14/04* (2013.01); *F27D 11/10* (2013.01); *F27D 99/0006* (2013.01)

(56) References Cited

FOREIGN PATENT DOCUMENTS

| | | | | |
|---|---|---|---|---|
| WO | WO-2007046713 A1 * | 4/2007 | ............ | B82Y 40/00 |
| WO | WO-2017129994 A1 * | 8/2017 | ............... | C25B 1/00 |

OTHER PUBLICATIONS

Huayi Yin, Lili Gao, Hua Zhu, Xuhui Mao, Fuxing Gan, Dihua Wang, On the development of metallic inert anode for molten CaCl2—CaO System, Electrochimica Acta, vol. 56, Issue 9, 2011, pp. 3296-3302 (Year: 2011).*

P.C. Pistorius and D.J. Fray, Formation of silicon by electro-deoxidation, and implications for titanium metal production, Journal of the Southern African Institute of Mining and Metallurgy, vol. 106, Issue 1 | Jan. 2006, (Year: 2006).*

Fray, D.J. Emerging molten salt technologies for metals production. JOM 53, 27-31 (2001). (Year: 2001).*

Aleksandar T Dimitrov, George Z Chen, Ian A Kinloch, Derek J Fray, A feasibility study of scaling-up the electrolytic production of carbon nanotubes in molten salts, Electrochimica Acta, vol. 48, Issue 1, 2002, pp. 91-102 (Year: 2002).*

M. E. Sibert et al., Electrolytic Reduction of Titanium Monoxide, 1955 J. Electrochem. Soc. 102 252 (Year: 1955).*

Viktorija Tomkute, Asbjørn Solheim, and Espen Olsen, Investigation of High-Temperature CO2 Capture by CaO in CaCl2 Molten Salt, Energy & Fuels 2013 27 (9), 5373-5379 (Year: 2013).*

Liwen Hu , Yang Song , Jianbang Ge , Jun Zhu and Shuqiang Jiao, Capture and electrochemical conversion of CO2 to ultrathin graphite sheets in CaCl2-based melts, J. Mater. Chem. A, 2015,3, 21211-21218 (Year: 2015).*

Suzuki, Ryosuke O.; Matsuura, Fumiya; Natsui, Shungo; Kikuchi, Tatsuya, Conversion of CO2 to CO gas using molten CaCl2 and ZrO2 anode, 1st International Conference on Energy and Material Efficiency and CO2 Reduction in the Steel Industry (EMECR2017), Oct. 11-13, 2017, Kobe, Japan., 350-353 (Year: 2017).*

Happiness V. Ijije , Richard C. Lawrence , Nancy J. Siambun , Sang Mun Jeong , Daniel A. Jewell , Di Hu and George Z. Chen, Electro-deposition and re-oxidation of carbon in carbonate-containing molten salts, Faraday Discuss., 2014, 172, 105-116 (Year: 2014).*

Gao et al., "Cathodic reaction kinetics for CO2 capture and utilization in molten carbonates at mild temperatures," Electrochemistry Communications, vol. 88, 2018, pp. 79-82.

Yin et al., "On the development of metallic inert anode for molten CaCl2—CaO System," Electrochimica Acta, vol. 56, Jan. 21, 2011, pp. 3296-3302.

Hu et al., "The synthesis of sulfur-doped graphite nanostructures by direct electrochemical conversion of CO2 in CaCl2—NaCl—CaO—Li2SO4," Carbon, vol. 144, 2019, pp. 805-814.

Hu et al., "Capture and electrochemical conversion of CO2 to ultrathin graphite sheets in CaCl2-based melts," Journal of Materials Chemistry A, vol. 3, 2015, pp. 21211-21218.

Hu et al., "Electrochemical deposition of carbon nanotubes from CO2 in CaCl2—NaCl-based melts," Journal of Materials Chemistry A, vol. 5, 2017, pp. 6219-6225.

Olsen et al., "Carbon capture in molten salts," Energy Science & Engineering, vol. 1, No. 3, 2013, pp. 144-150.

Jije et al., "Electro-deposition and re-oxidation of carbon in carbonate-containing molten salts," Faraday Discussions, vol. 172, 2014, pp. 105-116.

Ren et al., "One-Pot Synthesis of Carbon Nanofibers from CO2," Nano Letters, vol. 15, Aug. 3, 2015, pp. 6142-6148.

Ren et al., "The Minimum Electrolytic Energy Needed To Convert Carbon Dioxide to Carbon by Electrolysis in Carbonate Melts," The Journal of Physical Chemistry C, Oct. 2, 2015, vol. 119, pp. 23342-23349.

Licht et al., "Carbon Nanotubes Produced from Ambient Carbon Dioxide for Environmentally Sustainable Lithium-Ion and Sodium-Ion Battery Anodes," ACS Central Science, vol. 2, Mar. 2, 2016, pp. 162-168.

Chen et al., "Synthesis of nanostructured graphite via molten salt reduction of CO2 and SO2 at a relatively low temperature," Journal of Materials Chemistry A, vol. 5, 2017, pp. 20603-20607.

* cited by examiner

PRODUCTION OF CARBON PRODUCTS IN MOLTEN SALT MEDIA

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to production of carbon products, and more particularly, this invention relates to production of carbon products using a system that includes molten salt media, for example, molten $CaCO_3$:$CaCl_2$:CaO.

BACKGROUND

In general, various conventional techniques sequester or capture carbon dioxide ($CO_2$) emissions. Recently, capturing $CO_2$ emissions has become a primary focus for use in various systems. The issue with these approaches is that expense of these carbon capture or carbon sequester processes increases the operating costs of power plants and other processes. Some studies have attempted to counter these costs by utilizing catalysts or high temperatures (~2400° C.) to convert $CO_2$ to hydrocarbon products. However, these processes involve high operating and/or material costs, a net negative energy consumption, and a high probability that hydrocarbon will be burned to release $CO_2$ again.

Recently, molten salts have shown promising results for capturing carbon emissions. It would be desirable to develop a cost effective system that does not merely capture carbon from $CO_2$ emissions, but also produces a useable product that does not contribute to further $CO_2$ emissions.

SUMMARY

According to one embodiment, a system includes an electrochemical cell that includes a crucible having a molten $CaCO_3$:$CaCl_2$:CaO mixture therein, where a cathode and an inert anode are positioned in the molten $CaCO_3$:$CaCl_2$:CaO mixture, and an inlet for feeding carbon dioxide gas into the molten $CaCO_3$:$CaCl_2$:CaO mixture. In addition, the system includes a furnace having an inert atmosphere therein, where the electrochemical cell is sealed in the furnace having the inert atmosphere.

According to another embodiment, a method for forming a carbon product includes heating a $CaCO_3$:$CaCl_2$:CaO mixture in a crucible under an inert atmosphere to melt the $CaCO_3$:$CaCl_2$:CaO mixture, feeding a stream of carbon dioxide into the molten $CaCO_3$:$CaCl_2$:CaO mixture, where an inert anode and a cathode are positioned in the molten $CaCO_3$:$CaCl_2$:CaO mixture, applying a voltage differential across the inert anode and the cathode, removing an oxygen gas forming at the inert anode, and collecting the carbon product forming at the cathode.

Other aspects and advantages of the present invention will become apparent from the following detailed description, which, when taken in conjunction with the drawings, illustrate by way of example the principles of the invention.

DETAILED DESCRIPTION

Figure 1:
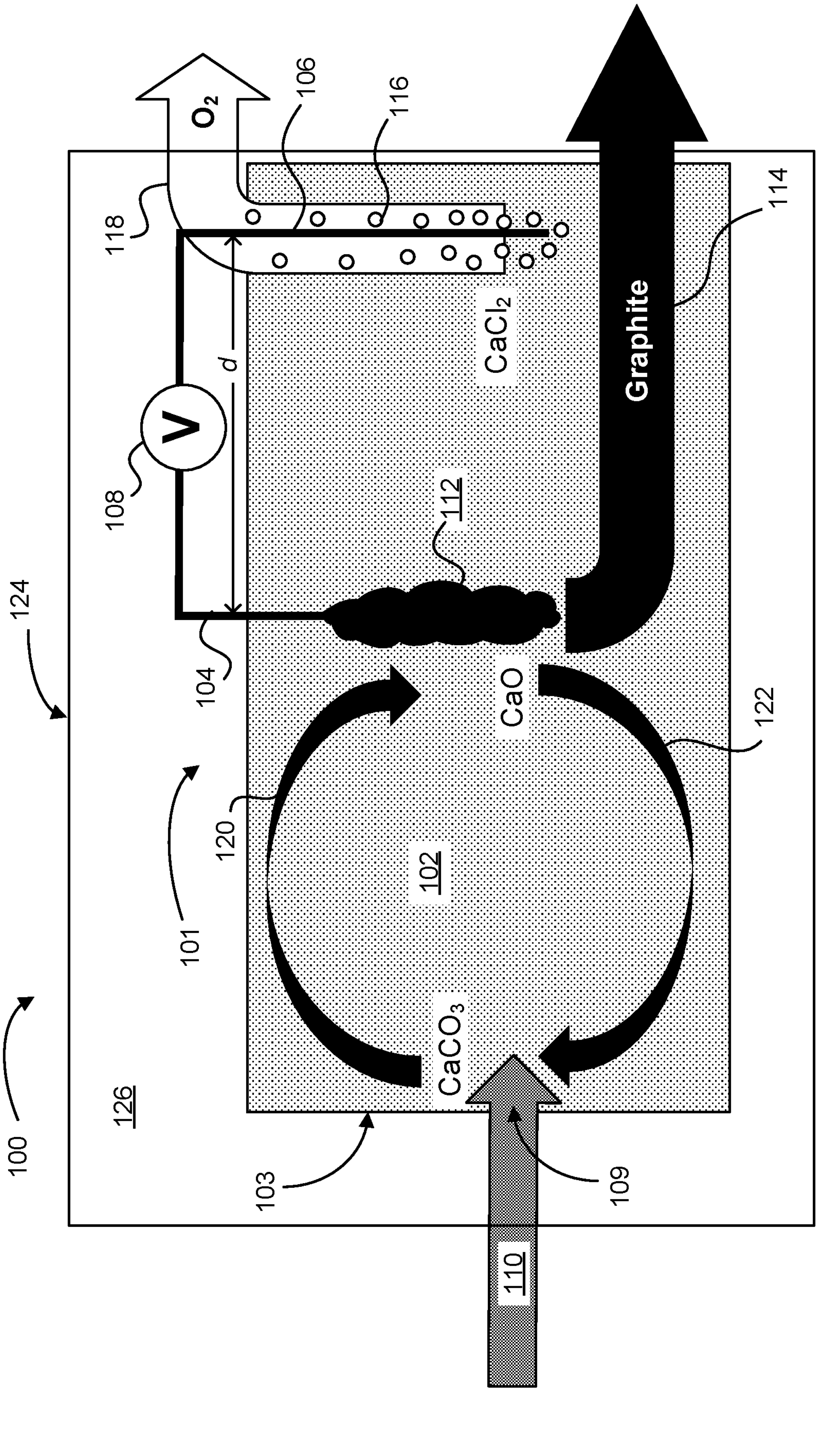
FIG. 1 depicts a schematic representation of a process of producing carbon, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

For the purposes of this application, room temperature is defined as in a range of about 20° C. to about 25° C.

The following description discloses several preferred embodiments of production of a carbon product using a system that includes molten salt media, and/or related systems and methods.

In one general embodiment, a system includes an electrochemical cell that includes a crucible having a molten $CaCO_3$:$CaCl_2$:CaO mixture therein, where a cathode and an inert anode are positioned in the molten $CaCO_3$:$CaCl_2$:CaO mixture, and an inlet for feeding carbon dioxide gas into the molten $CaCO_3$:$CaCl_2$:CaO mixture. In addition, the system includes a furnace having an inert atmosphere therein, where the electrochemical cell is sealed in the furnace having the inert atmosphere.

In another general embodiment, a method for forming a carbon product (e.g., graphite) includes heating a $CaCO_3$:$CaCl_2$:CaO mixture in a crucible under an inert atmosphere to melt the $CaCO_3$:$CaCl_2$:CaO mixture, feeding a stream of carbon dioxide into the molten $CaCO_3$:$CaCl_2$:CaO mixture, where an inert anode and a cathode are positioned in the molten $CaCO_3$:$CaCl_2$:CaO mixture, applying a voltage differential across the inert anode and the cathode, removing an oxygen gas forming at the inert anode, and collecting the carbon product forming at the cathode.

A list of acronyms used in the description is provided below.

C carbon
° C. degrees Celsius
$CaCO_3$ calcium carbonate
$CaCl_2$ calcium chloride
CaO calcium oxide
$CO_2$ carbon dioxide
$CO_3^{2-}$ carbonate ion
$O^{2-}$ oxide ion
$O_2$ oxygen gas
Wt % weight percent The goal of embodiments described herein is to provide a valuable product that is usable, for example, to counter the additional cost of carbon capture at power plants and carbon emitting industrial sites.

Development of processes to form carbon from molten carbonate mixtures have had significant drawbacks. In particular, processes using a ternary mixture of $Li_2CO_3$, $K_2CO_3$, and $Na_2CO_3$ results in debilitating passivation of the electrodes with increasing current in the system. Since the transformation of carbon being produced on the electrode occurs at the interface of the salt and the electrode, the released oxides (e.g., $Li_2O$, $K_2O$, $Na_2O$, etc.), having a low solubility, precipitate out of solution and on to the surfaces thereby causing passivation of the electrode. Consequently, the rate at which carbon is produced is limited in these systems. Due to the low solubility of oxides in conventional carbonate molten salts, the rate of production may be limited by passivation of the electrode via oxide precipitation at the electrode-salt interface.

Some attempts of a carbon capture process in molten salt $CaCl_2$—CaO—$CaCO_3$ rely on a temperature flux for capture and release of $CO_2$, where a cyclability to capture $CO_2$ from an impure/dilute gas stream can subsequently release pure $CO_2$ upon increasing the temperature to decompose the calcium carbonate to calcium oxide. The process absorbs $CO_2$ at low temperature and releases $CO_2$ at high temperatures, and thus is a two-step process involving adsorption and then heating to release the $CO_2$. In sharp contrast, embodiments described herein include a continuous process at a constant moderate temperature (e.g., in some approaches less than 850° C.) bubbling $CO_2$ in a molten $CaCO_3$:$CaCl_2$:CaO mixture that includes a series of electrochemical reactions to form a carbon product.

FIG. 1 depicts a system 100 for forming a carbon product, in accordance with one embodiment. As an option, the present system 100 may be implemented in conjunction with features from any other embodiment listed herein, such as those described with reference to the other FIGS. Of course, however, such system 100 and others presented herein may be used in various applications and/or in permutations which may or may not be specifically described in the illustrative embodiments listed herein. Further, the system 100 presented herein may be used in any desired environment.

According to one embodiment, the system 100 includes an electrochemical cell 101. The electrochemical cell 101 includes a crucible 103 having a molten $CaCO_3$:$CaCl_2$:CaO mixture 102 therein. In addition, a cathode 104 and an inert anode 106 are positioned in the molten $CaCO_3$:$CaCl_2$:CaO mixture 102.

According to one approach, the crucible 103 contains a molten salt mixture 102 of $CaCl_2$, $CaCO_3$, and CaO. Preferably, in some approaches, the molten salt mixture contains as much calcium (Ca) as possible to enhance the solubility of the $CO_3^{2-}$ ions. The composition of the molten salt mixture 102 may preferably include less than about 20 wt % CaO, less than about 35 wt % of $CaCO_3$, and a balance wt % of $CaCl_2$ to form 100% of total mixture. In some approaches, it is preferable for the concentration of CaO to be less than 20 wt % of total molten salt mixture. At concentrations greater than 20 wt %, the CaO may be saturated in the molten salt mixture such that the additional oxide produced may tend to passivate the cathode. In approaches with high concentrations of CaO, e.g., greater than 20 wt %, the efficiency and purity of the carbon product (e.g., graphite) formed at the cathode is decreased due to passivation of the cathode. Thus, the concentration of CaO in the molten salt mixture is critical for efficient formation of a pure carbon product (e.g., optimal rates of carbon production). In a preferred approach, the concentration of CaO is less than 20 wt % of total weight of molten salt mixture.

In one approach, it is critical to include $CaCO_3$ in the salt mixture as a vital component of the molten salt mixture before addition of $CO_2$. The presence of $CaCO_3$ in the salt mixture allows carbon production on the cathode to begin immediately. In preferred approaches, the presence of $CaCO_3$ in the salt mixture allows continuous production of carbon at the cathode. In sharp contrast, conventional systems rely on a batch process where $CaCO_3$ must form initially via a reaction with $CO_2$, which limits the production rate of carbon because the reaction of CaO and incoming $CO_2$ must exceed the reduction of $CaCO_3$ to graphite and CaO to generate an appreciable $CaCO_3$ concentration. In some approaches, the system as described herein allows continuous production of graphite at the cathode.

In some approaches of embodiments described herein, the concentration of $CaCO_3$ in the molten salt mixture may determine the rate controlling mechanism of the formation of carbon product at the cathode. In one approach, the composition of the molten $CaCO_3$:$CaCl_2$:CaO mixture includes less than about 35 wt % $CaCO_3$ of a total wt of the composition. At higher concentrations (wt %) of $CaCO_3$, the rate controlling mechanism of the reaction is kinetically limiting. At lower concentrations (wt %) of $CaCO_3$, the rate controlling mechanism is mass transfer due to a more limited availability of $CO_3^{2-}$ ions in the molten salt mixture. The morphology of the carbon product may be defined by the rate controlling mechanism of the reaction, and in turn, the concentration of the $CaCO_3$ of the molten salt mixture.

In one embodiment, an additive may be included to the molten salt mixture of the cell to aid in formation of carbon product at the cathode, for example for forming carbon at the cathode. In one approach, the additive may provide a sulfate ion, for example, lithium sulfate ($Li_2SO_4$), calcium sulfate ($CaSO_4$), etc. In one approach, the concentration of $CaSO_4$ may be less than 12 wt % of total molten salt mixture.

According to one embodiment, the electrochemical cell 101 includes the crucible 103. The composition of the material of the crucible preferably includes material that does not react with the molten salt mixture (e.g., $CaCO_3$:$CaCl_2$:CaO). In some approaches, the material of the crucible may include ceramic material, e.g., MgO, $Al_2O_3$, etc. In other approaches, the material of the crucible may include a metal, e.g., nickel, tungsten, molybdenum, etc. In some approaches the material of the crucible may include a metal that is acid resistant, e.g., noble metals, platinum, rhodium, a platinum/rhodium composite, etc. In yet other approaches, the material of the crucible may include a combination of ceramic and metal materials, e.g., a ceramic-coated metal crucible, a metal crucible with a pre-oxidized surface, a hybrid metal-ceramic system, etc.

According to one embodiment, the system 100 includes a voltage differential 108, or current, applied to the electrochemical cell 101 between the two electrodes, one electrode being the inert anode 106 and the other electrode being the cathode 104. Both electrodes, i.e., cathode 104 and inert anode 106, may be positioned in the molten salt mixture 102.

In one approach, the inert anode is comprised of a non-reactive metal. In some approaches, the material of the inert anode may include one of the following metals: tungsten (W), platinum (Pt), nickel (Ni), molybdenum (Mo), stainless steel, etc. In one approach, the metal of the inert anode may be pre-oxidized to obtain an oxide surface, a thin oxide layer, a passivation layer, etc. on the anode thereby allowing the anode to be resilient to conditions of the molten salt medium. In some approaches, the inert anode includes nickel and the oxide layer adheres very tightly to the nickel and forms a resilient dense layer of nickel oxide. In preferred approaches, the inert anode may include an alloy of nickel, decomposed into a nickel oxide. Materials such as nickel, alloys of nickel, nickel oxide, etc. are easily obtained and economical for scaling the system described herein for large scale production of a carbon product.

In some approaches, the material of the cathode may include one of the following metals W, Pt, Ni, Mo, stainless steel, etc.

A conventional electrochemical cell relies on diffusion of components (e.g., formation of calcium carbonate) of the system for forming a product (e.g., carbon) at a cathode. However, relying solely on diffusion of components limits the rate of mass transfer of components within the system to form a product on the cathode. In one embodiment described herein, the inert anode 106 and cathode 104 are preferably positioned a predefined distance d apart from each other to allow enhanced mass transfer of the components from the molten salt mixture to reduce to carbon product 112 (e.g., graphite) on the cathode 104. In one approach, the electrochemical cell may include a mixing device to increase motion of the components within the cell.

In some approaches, the distance d between the anode 106 and cathode 104 may be determined such that a gas product 116 released from the anode 106 (e.g., oxygen) does not react with the carbon product 112 being deposited on the cathode 104. In one approach, the distance is a minimum distance between the inert anode and the cathode to prevent contact between gas released at the inert anode and the cathode.

Various techniques may be employed to separate the anode and the cathode to make sure the gas produced is removed from the molten salt mixture and does not passivate the cathode. In one approach, the system may include a spacer between the inert anode and the cathode. Examples of techniques to separate the electrodes may include a membrane, a sheath, a spacer, etc. Ideally, a predefined spacing is configured around the anode, e.g., using a membrane, sheathing, etc. to pull the oxygen away from the cathode and molten salt thereby preventing the oxygen from reacting with the molten salt and then reacting with the formed carbon product on the cathode.

The geometry of the electrodes may be tuned to optimize the formation of carbon products. The electrodes may have a geometry of a wire mesh, a sheet, etc. In some approaches, the electrodes may have a separate sheath around the electrode, may have an ion permeable membrane around the electrode, etc.

In preferred approaches, the surface area of the anode is significantly larger than the surface area of the cathode. Since the carbon product is produced on the cathode, ideally the cathode surface area is the controlling factor. In one approach, a surface of the inert anode may be at least five-fold larger than a surface area of the cathode. In some approaches, the anode may preferably have a surface area 10-fold larger than the surface area of the cathode to ensure that reactions at the anode do not limit the cell current.

In one approach of the system 100, the electrochemical cell 101 includes an inlet 109 for feeding carbon dioxide $CO_2$ gas 110 into the molten $CaCO_3$:$CaCl_2$:CaO mixture 102. In addition, the system 100 includes a furnace 124 having an inert atmosphere 126 therein. In one approach, the electrochemical cell 101 may be sealed in the furnace 124 having the inert atmosphere 126.

Figure 2:
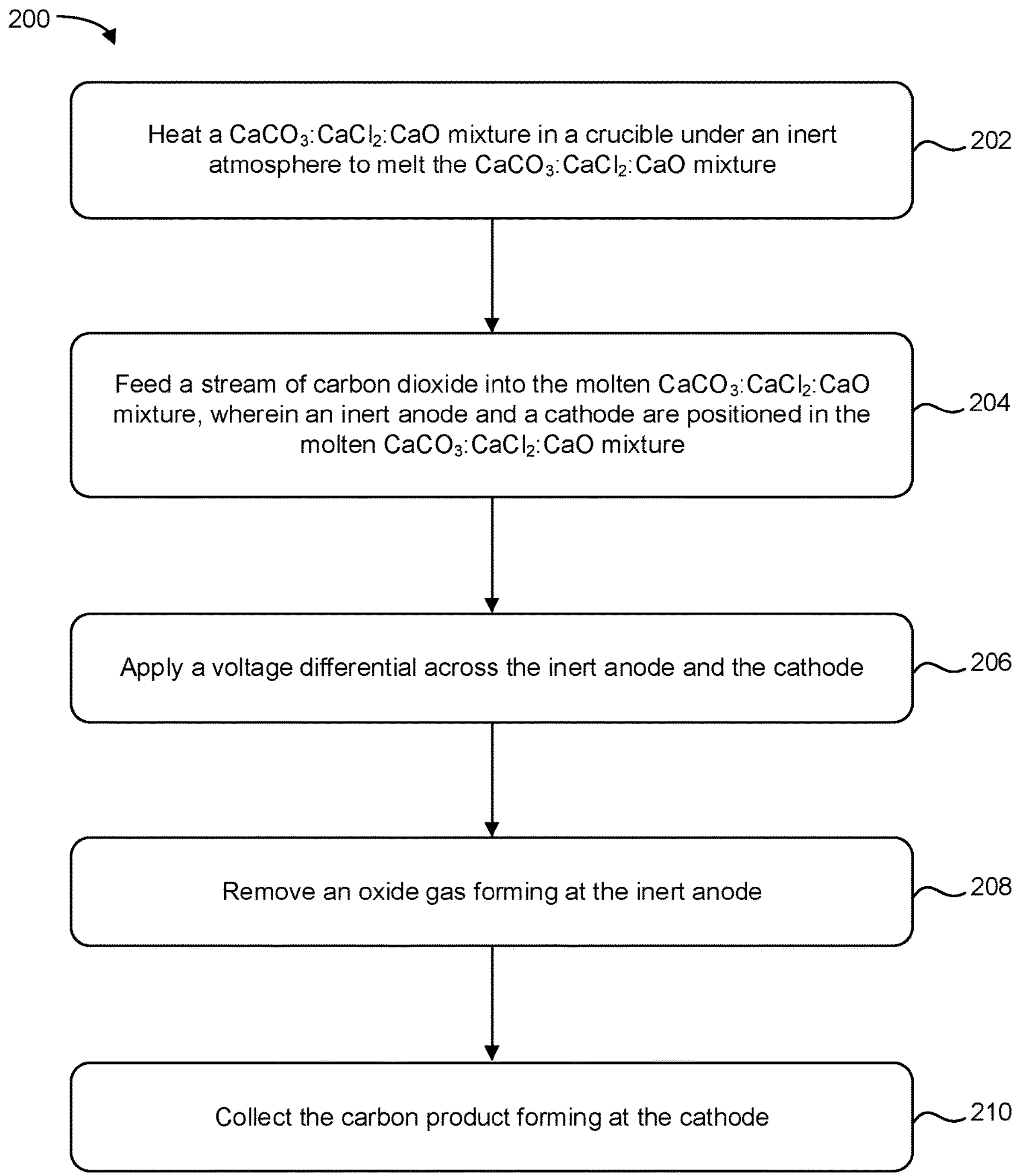
FIG. 2 is a flowchart of a method, according to one embodiment.

FIG. 2 shows a method 200 for forming a carbon product, in accordance with one embodiment. As an option, the present method 200 may be implemented to systems such as those shown in the other FIGS. described herein. Of course, however, this method 200 and others presented herein may be used to form a carbon product for a wide variety of devices and/or purposes which may or may not be related to the illustrative embodiments listed herein. Further, the methods presented herein may be carried out in any desired environment. Moreover, more or less operations than those shown in FIG. 2 may be included in method 200, according to various embodiments. It should also be noted that any of the aforementioned features may be used in any of the embodiments described in accordance with the various methods.

Method 200 of FIG. 2 begins with operation 202 of heating a $CaCO_3$:$CaCl_2$:CaO mixture in a crucible under an inert atmosphere to melt the $CaCO_3$:$CaCl_2$:CaO mixture. According to one embodiment, the process includes an electrochemical cell in a furnace having an inert atmosphere (e.g., argon, nitrogen, etc.). In another approach, the atmosphere surrounding the electrochemical cell is under a vacuum.

As described for the system 100 in FIG. 1, the $CaCO_3$:$CaCl_2$:CaO mixture includes preferably less than 20 wt % CaO, less than about 35 wt % $CaCO_3$, and a balance wt % of $CaCl_2$ to form 100% total mixture. Operation 202 of method 200 (refering to FIG. 2) includes heating the salt mixture in a crucible for forming a molten $CaCO_3$:$CaCl_2$:CaO mixture. In one approach, the $CaCO_3$:$CaCl_2$:CaO mixture includes an additive. In one approach, the $CaCO_3$:$CaCl_2$:CaO mixture includes an additive that provides a sulfate ion. In some approaches, the sulfate ion may promote enhanced mass transfer of carbon to the cathode in the system. In one approach, a concentration of the additive providing the sulfate ion may be less than 12 wt % of total weight of the molten $CaCO_3$:$CaCl_2$:CaO mixture.

In one approach, the concentration of $CaCO_3$ in the $CaCO_3$:$CaCl_2$:CaO mixture may define the morphology of the carbon product collected at the cathode.

The molten salt mixture in the crucible may be heated in the furnace to an effective temperature to maintain the salt as a molten mixture and to allow the carbon to form at the cathode. In some approaches, the temperature inside the furnace may be in a range of 775° C. to less than 1000° C. In preferred approaches, the molten salt mixture may be heated to a temperature in a range of 775° C. to less than 875° C. In some approaches, the molten salt mixture may be heated to above 1000° C., however, the system may become less cost effective at these elevated temperatures.

In preferred approaches, the atmosphere in the furnace surrounding the crucible remains primarily an inert gas, such that the atmosphere may continually pull released oxygen away from the system. In some approaches, the furnace is continually flushed with inert gas, e.g., argon, nitrogen, etc. In one approach, the inert atmosphere is continually flushed with an inert gas.

Operation 204 of method 200 includes feeding a stream of carbon dioxide into the molten $CaCO_3$:$CaCl_2$:CaO mixture. The inert anode and the cathode are positioned in the molten $CaCO_3$:$CaCl_2$:CaO mixture. As illustrated in system 100 in FIG. 1, carbon dioxide ($CO_2$) 110 is fed into the electrochemical cell 101 by a certain process and bubbled into a molten salt mixture 102 of $CaCO_3$:$CaCl_2$:CaO.

In one approach, $CO_2$ 110 may be fed to the electrochemical cell 101 using techniques for an inlet 109 generally understood by one skilled art. For example, $CO_2$ may be fed by a tube, pipe, gas line, etc. In some approaches, the tubing is fit to bubble $CO_2$ into the molten salt mixture of the cell in the furnace at a predefined rate. In preferred approaches, the $CO_2$ is bubbled into the molten salt mixture with an inert gas still covering the salt (e.g., in an inert atmosphere) in the furnace. $CO_2$ may be fed purely by itself or in a gas mixture with an inert gas ($N_2$, Ar, etc.) In one approach, the rate of $CO_2$ bubbled through the salt mixture in the cell is a predefined rate so that the amount of carbon product formed on the cathode is relative to the rate of incoming $CO_2$. In some approaches the rate of $CO_2$ bubbled through the salt mixture is dependent on the rate of reaction. Ideally, all incoming $CO_2$ is transformed to carbon product on the cathode.

With continued reference to the schematic diagram of FIG. 1, the incoming $CO_2$ 110 may combine with CaO in a reaction 122 of forming $CaCO_3$ in the salt mixture 102. As described herein, the presence of $CaCO_3$ in the molten $CaCO_3$:$CaCl_2$:CaO mixture is critical for efficient formation of carbon product at the cathode. Moreover, an initial bulk concentration of calcium carbonate in the system provides a buffer of calcium carbonate. In some approaches, calcium carbonate formed from incoming $CO_2$ may be transported from the point of generation to the bulk of the salt at the same rate the $CaCO_3$ is transported and reduced to a carbon product.

In contrast, conventional systems that rely solely on the reaction of $CO_2$ with CaO to form calcium carbonate ions likely result in low and inefficient mass transfer of carbon product at the cathode due to a limited availability of carbonate ions. Moreover, in systems that rely on incoming $CO_2$ to supply the calcium carbonate, the calcium carbonate needs to be transported from the point of formation to the electrode where it will be reduced. It is preferable for the $CO_2$ to be bubbled into the system away from the cathode because bubbling can dislodge the carbon product from the cathode, thereby trapping the carbon product in the salt causing recovery of the carbon product to be even more difficult.

Looking back to method 200 of FIG. 2, operation 206 includes applying a voltage differential across the inert anode and the cathode. As illustrated in FIG. 1, the voltage differential 108 of the electrochemical cell 101 allows carbon product 112 to form at the cathode 104 from a reduction reaction 120 of the $CaCO_3$ at the cathode 104. Following the reduction reaction 120 of $CaCO_3$ at the cathode, a byproduct CaO is released and remains soluble in the molten salt. Thus, via the reaction 122, free CaO reacts with $CO_2$ 110 bubbling into the system 100.

In one approach, voltage and/or current is applied to the electrochemical cell such that carbon from the carbonate ions ($CO_3^{2-}$) is selectively deposited as a carbon product (C) on the cathode (Equation 1). The oxide ions $O^{2-}$ collect at the anode and may be released as oxygen gas ($O_2$) (Equation 2). The byproduct from the reduction reaction (Equation 1) at the cathode is CaO which may be reacted with incoming $CO_2$ to regenerate carbonate ions ($CO_3^{2-}$) that are in turn available for reduction to carbon (Equation 3).

At Cathode: $CaCO_3+4e^-\rightarrow CaO+C+2O^{2-}$ Equation 1

At Anode: $2O^{2-}\rightarrow 4e^-+O_{2(g)}$ Equation 2

In Molten Salt Mixture: $CaO+CO_2\rightarrow CaCO_3$ Equation 3

Referring back to method 200 in FIG. 2, after the voltage differential has been applied, operation 208 includes removing the oxygen gas forming at the inert anode. Looking to system 100 of FIG. 1, with formation of carbon product 112 at the cathode 104, oxygen gas ($O_2$) is released 118 from mixture 102 at the anode 106.

In one embodiment described herein, a molten carbonate salt mixture includes a calcium salt that improves solubility for oxide ions to accommodate a high concentration of oxide ions in the system. In one approach, oxide ions released in the molten carbonate salt mixture may be dissolved into the calcium chloride salt and removed from the interface of the salt and the electrode thereby allowing a higher rate of production of carbon product. In some approaches, the bubbling of the $CO_2$ in the system may aid in circulating the oxide ions in the mixture. In some approaches, physically stirring the mixture, e.g., magnetic mixer, overhead stirring, etc., may aid in circulating the oxide ions in the mixture. Moreover, the $CaCO_3$ and the CaO are better dissolved into the $CaCl_2$ of the molten salt mixture and that allows the removal of oxide ions from the interface of the electrode and the salt. By using the chloride based molten salt, the solubility of oxide may be increased 10-fold. Moreover, in some approaches, a higher current may be used to run the system without passivating the electrodes.

Referring back to method 200 in FIG. 2, operation 210 includes collecting the carbon product forming at the cathode. In some approaches, operation 208 of removing an oxygen gas forming at the inert anode may occur simultaneously as operation 210 of collecting the carbon product forming at the cathode. As illustrated in FIG. 1, the carbon product 112 may be removed 114 from the cathode 104 as graphite.

In various embodiments, the formed carbon product may be removed from the cathode. For example, the carbon product may be scraped off the electrode, may be removed by soaking the electrode in solvent, etc. In preferred approaches, a removal technique is used that retains the shape of the formed carbon product.

In some approaches, the carbon product may be removed from the cathode (e.g., resetting the cathode), and/or the cathode being replaced at predefined intervals during carbon deposition in order to maintain efficiency of the system. In some approaches, as the carbon product increases in thickness on the cathode, a short may develop between the electrodes. Cleaning and/or replacement of the cathode should be performed prior to formation of the short. In some approaches, as the carbon product increases in thickness on the cathode, an increased branching of the product may lessen the physical attachment of the carbon product to the cathode thereby reducing the yield of carbon product in the system.

As described herein, various embodiments may utilize captured carbon emissions to synthetically produce graphite and other high-value carbon products in molten salt media via electrochemical reduction and transformation of the carbon from the carbonate ion. According to various embodiments described herein, a molten salt media and cell are designed to regenerate the carbonate ions in the cell from carbon dioxide ($CO_2$) by reacting the $CO_2$ with the reduction byproduct of calcium oxide (CaO). The process described herein offers distinct advantages over conventional synthetic processes of forming carbon products which operate with temperatures higher than those utilized in embodiments described herein, e.g., conventional processes operate with temperatures up to 3000° C. The proposed embodiments as described may produce graphite at temperatures as low as 825° C. while utilizing or capturing carbon emissions.

In various embodiments, graphite is produced from $CO_2$ using a system including low cost and ubiquitous $CaCO_3$. The high solubility of CaO in $CaCl_2$ lowers the risk of passivation of the cathode that could be caused by precipitation of oxide byproducts. Various embodiments disclose the appropriate conditions and methodology for efficiently producing graphite from a molten $CaCO_3$:$CaCl_2$:CaO mixture.

In Use

Various embodiments described herein may be developed for use at a power plant, steel mills, and other carbon dioxide emitting industrial processes to utilize and convert carbon dioxide to high-value carbon products. Some embodiments as described allow producing a carbon product (e.g., graphite) at a high enough rate and at a cost-efficient rate to offset the cost of a high value graphite product useful in industries that rely on high purity graphite. Some embodiments may be developed for use in energy storage and electronic devices.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments but should be defined only in accordance with the following claims and their equivalents.

What is claimed is:

1. A system comprising, an electrochemical cell comprising, a crucible having a molten $CaCO_3$:$CaCl_2$:CaO mixture therein, wherein a cathode and an inert anode are positioned in the molten $CaCO_3$:$CaCl_2$:CaO mixture, and an inlet for feeding carbon dioxide gas into the molten $CaCO_3$:$CaCl_2$:CaO mixture; and a furnace having an inert atmosphere therein, wherein the electrochemical cell is sealed in the furnace having the inert atmosphere, wherein the furnace is configured to heat the crucible to an effective temperature to maintain the $CaCO_3$:$CaCl_2$:CaO as a molten mixture and to allow carbon to form at the cathode, the effective temperature being less than 875 degrees Celsius, wherein a surface area of the inert anode is at least five-fold larger than a surface area of the cathode.

2. The system as recited in claim 1, wherein the inert anode comprises a metal selected from the group consisting of: tungsten, platinum, nickel, and molybdenum.

3. The system as recited in claim 2, wherein the metal has an oxidized surface.

4. The system as recited in claim 1, wherein a composition of the molten $CaCO_3$:$CaCl_2$:CaO mixture comprises less than about 20 weight % CaO of a total weight of the composition.

5. The system as recited in claim 1, wherein a composition of the molten $CaCO_3$:$CaCl_2$:CaO mixture comprises greater than 1 weight % up to about 35 weight % $CaCO_3$ of a total weight of the composition.

6. The system as recited in claim 1, wherein a composition of the molten $CaCO_3$:$CaCl_2$:CaO mixture comprises:

less than about 20 weight % CaO of a total weight of the composition, greater than 1 weight % up to about 35 weight % $CaCO_3$ of the total weight of the composition, and a balance weight % of $CaCl_2$ to the total weight of the composition.

7. The system as recited in claim 1, wherein the molten $CaCO_3$:$CaCl_2$:CaO mixture further comprises an additive, the additive providing a sulfate ion.

8. The system as recited in claim 1, wherein the inert anode is positioned a distance from the cathode, wherein the distance is a minimum distance between the inert anode and the cathode to prevent contact between gas released at the inert anode and the cathode.

9. The system as recited in claim 1, comprising a spacer between the inert anode and the cathode.

10. The system as recited in claim 9, wherein the spacer is selected from the group consisting of: a sheath, a membrane, and a mesh.

11. The system as recited in claim 1, wherein the crucible is comprised of at least one material selected from the group consisting of: a metal, a ceramic material, and a combination thereof.

12. The system as recited in claim 11, wherein the metal is selected from the group consisting of: nickel, tungsten, molybdenum, noble metals, platinum, and rhodium.

13. The system as recited in claim 1, wherein the inert atmosphere is under a vacuum.

14. A system comprising, an electrochemical cell comprising, a crucible having an initial molten $CaCO_3$:$CaCl_2$:CaO mixture therein, wherein a cathode and an inert anode are positioned in the initial molten $CaCO_3$:$CaCl_2$:CaO mixture, and an inlet for feeding carbon dioxide gas into the initial molten $CaCO_3$:$CaCl_2$:CaO mixture, wherein a surface area of the inert anode is at least five-fold larger than a surface area of the cathode.

15. The system as recited in claim 14, wherein the inert anode comprises a metal selected from the group consisting of: tungsten, platinum, nickel, and molybdenum.

16. The system as recited in claim 15, wherein the metal has an oxidized surface.

17. The system as recited in claim 14, wherein a composition of the initial molten $CaCO_3$:$CaCl_2$:CaO mixture comprises greater than 1 weight % up to about 35 weight % $CaCO_3$ of a total weight of the composition.

18. The system as recited in claim 14, wherein a composition of the initial molten $CaCO_3$:$CaCl_2$:CaO mixture comprises:

less than about 20 weight % CaO of a total weight of the composition, greater than 1 weight % up to about 35 weight % $CaCO_3$ of the total weight of the composition, and a balance weight % of $CaCl_2$ to the total weight of the composition.

19. The system as recited in claim 14, further comprising, a furnace, wherein the electrochemical cell is sealed in the furnace, wherein the furnace is configured to heat the crucible to an effective temperature to maintain the $CaCO_3$:$CaCl_2$:CaO as a molten mixture and to allow carbon to form at the cathode, the effective temperature being less than 875 degrees Celsius.

20. A system comprising, an electrochemical cell comprising, a crucible having an initial molten $CaCO_3$:$CaCl_2$:CaO mixture therein, wherein a cathode and an inert anode are positioned in the molten $CaCO_3$:$CaCl_2$:CaO mixture, and an inlet for feeding carbon dioxide gas into the initial molten $CaCO_3$:$CaCl_2$:CaO mixture; and a furnace having an inert atmosphere therein, wherein the electrochemical cell is sealed in the furnace having the inert atmosphere, wherein a surface area of the inert anode is at least five-fold larger than a surface area of the cathode.

* * * * *